United States Patent [19]

Mentele

[11] Patent Number: 4,570,721
[45] Date of Patent: Feb. 18, 1986

[54] DEVICE FOR WEEDING VINE OR SIMILAR CROPS

[76] Inventor: Pat Mentele, P.O. Box 41, Woonsocket, S. Dak. 57385

[21] Appl. No.: 599,655

[22] Filed: Apr. 12, 1984

[51] Int. Cl.⁴ .................. A01B 33/06; A01B 33/14
[52] U.S. Cl. ................................ 172/99; 172/117; 172/111
[58] Field of Search ............... 172/99, 98, 110, 111, 172/431, 432, 433, 434, 435, 117

[56] References Cited

U.S. PATENT DOCUMENTS

| | | | |
|---|---|---|---|
| 1,441,789 | 1/1923 | Doubleday | 172/111 X |
| 1,791,063 | 2/1931 | Millin | 172/99 X |
| 2,619,891 | 12/1952 | Sloper | 172/111 X |
| 2,764,077 | 9/1956 | Pertics | 172/99 X |
| 3,169,583 | 2/1965 | Thurow | 172/111 |
| 3,315,753 | 4/1967 | Propst | 172/81 |

FOREIGN PATENT DOCUMENTS

| | | | |
|---|---|---|---|
| 703057 | 1/1954 | United Kingdom | 172/99 |
| 1116346 | 6/1968 | United Kingdom | 172/111 |

Primary Examiner—Richard J. Johnson

[57] ABSTRACT

A device for weeding such vine crops as melons, cucumbers or the like comprising a tool bar adapted to be carried by a tractor. The tool bar in turn carries multiple rotary agitators adapted to stir the earth and uproot plants with which they come into contact. The agitators are driven by motors and are suspended from the tool bar so that they can be raised or lowered. Springs may be used to bias the agitator to particular position and seats may be carried by the tool bar so that operators of the agitators may ride over the field.

4 Claims, 3 Drawing Figures

DEVICE FOR WEEDING VINE OR SIMILAR CROPS

BACKGROUND AND SUMMARY OF THE INVENTION

This invention pertains to agricultural implements and more particularly to an implement useful in the cultivation and weeding of vine crops such as melons or cucumbers although it may be adapted to other crops.

Many vegetable crops, particularly those grown on vines such as melons, still require a good deal of individual manual labor. The vines cannot be confined to rows in the manner of corn, sugar beets or the like. Neither can they be trained on fences or similar supports in the manner of grape vines. In general, they are allowed to run on the ground although efforts are made to limit somewhat their wandering.

Because of the uncertain limits of the areas of growth, it is often necessary for an individual to thin and weed such crops by using an ordinary garden hoe. This type of labor is tedious and therefore is not desirable so that workers are increasingly difficult to find.

By my invention, I provide a device which will mechanically thin or weed such crops. An operator may be necessary with my device, but the work is much easier and much faster than single manual labor. Also, I can provide seats for the operators so that the device may be moved relatively rapidly over the field without tiring the operators. Actually, my device is simple enough so that a child may operate the device as soon as he or she can distinguish weeds from desirable plants, and has the necessary strength to press the device into the ground. For safety purposes it may be desirable that the operator be mature enough to be able to form reasonably sound judgment even though the operation is simple.

FIGURES

DESCRIPTION

Figure 1:
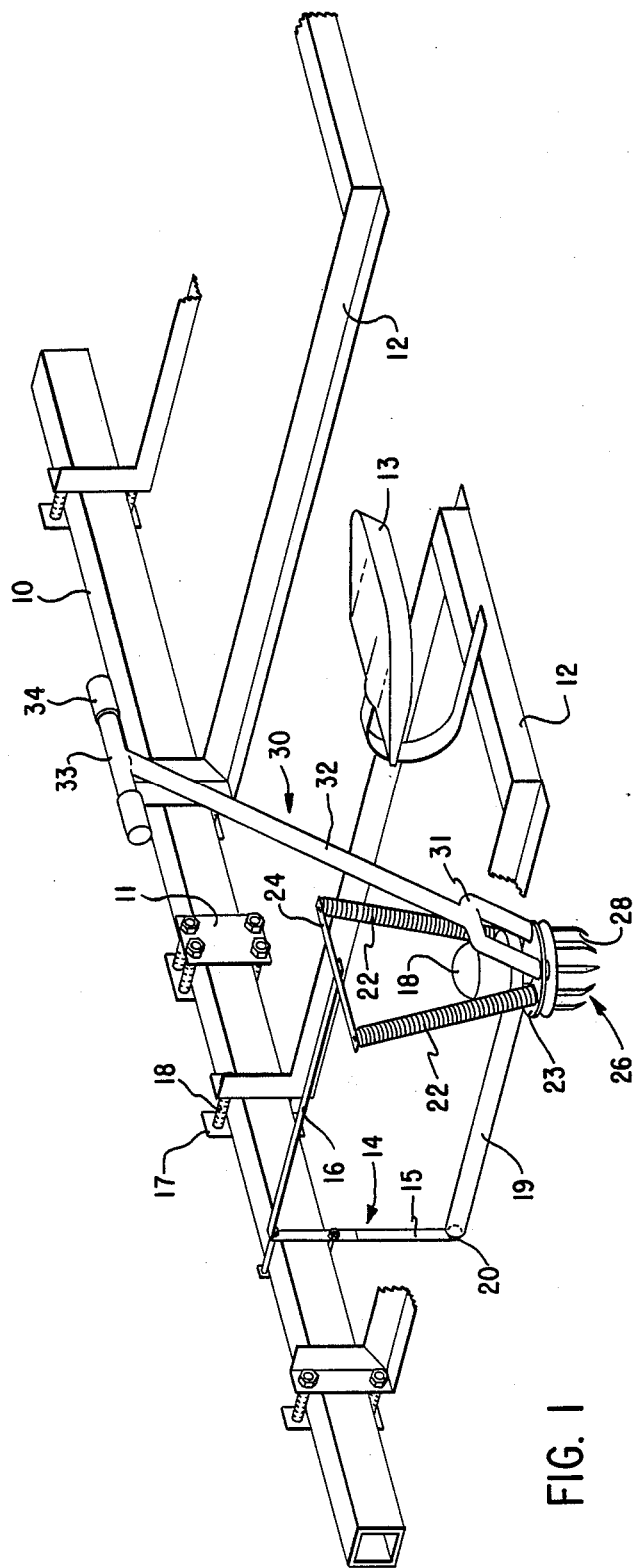
FIG. 1 is a pictorial view of my device adapted to be mounted on a tractor.
Figure 2:
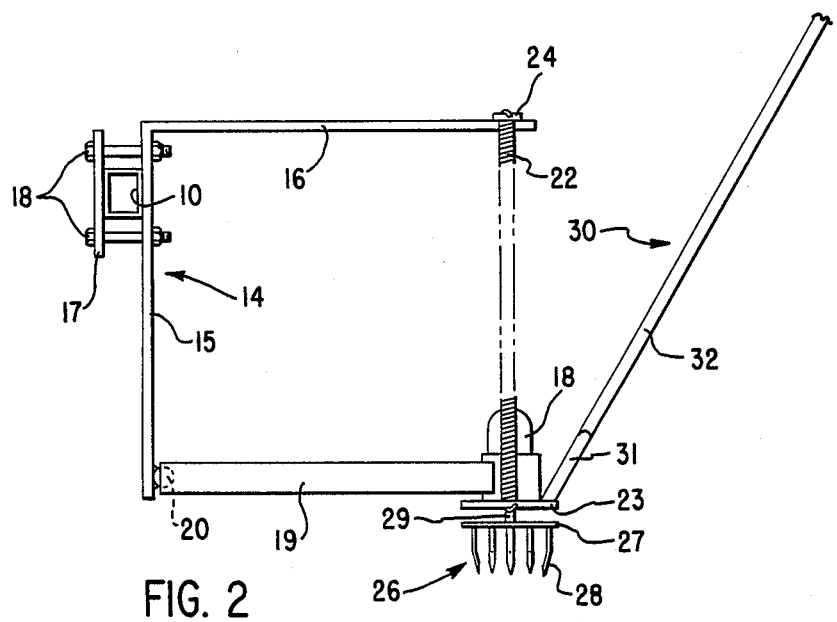
FIG. 2 is an end view of the device.

Briefly my invention is embodied in a device mounted on a tool bar carried by a farm tractor and one or more brackets. Earth agitating means are mounted on the brackets for vertical and limited lateral movement to be controlled by an operator riding on an adjacent seat.

More specifically, my device includes a tool bar 10 adapted to be attached by means of a clamping attaching device 11 to the three-point or similar lifting hatch on a farm tractor not shown. At least one frame 12 is firmly clamped or otherwise fixed to the tool bar 10. This frame carries a seat 13 on which the operator of the weeding device car ride.

The weeding device itself is carried by a bracket 14, which is preferably right angular in elevation, having a vertical leg 15 and a horizontal leg 16. The vertical leg is securely clamped to the tool bar 10 by means of a clamping plate 17 and bolts 18. Thus, the actual spacing on both the framework 12 and the bracket 14 on the tool bar 10 is adjustable anywhere along the bar.

In most cases it will probably be preferable to use duplicate assemblies on both sides of the clamping devices 11 so that the torsional load on the tractor hatch will be merely neutralized. However, I recognize that a single assembly could be used near the center of the bar; that three assemblies could be spaced along the bar with one near the center, or that other multiple assemblies may be used.

The weeding device itself is mounted on the bracket 14 and includes a motor 18 fixed to a bar 19. The bar is movably connected to the lower end of the vertical leg 15 of the bracket 14. The connection is preferably one which will allow movement in all directions around the joint 20 as a center. I have illustrated a ball and socket joint 20, but a universal joint type of connection could also be used. The principal desideratum is that the device be universally movable both vertically and laterally.

The device is controlled by the use of a pair of tension springs 22 attached between a mounting plate 23 for the motor 18 and cross bar 24 attached to the horizontal leg 16 of the bracket 14. The spacing of the ends of the springs on the bar 24 is preferably somewhat wider than that at the mounting plate 23. Thus, there is a tendency for the motor to be centered by the action of the springs having a horizontal component of forces pulling against each other.

The motor 18 is preferably an hydraulic motor because any farm tractor having a lifting latch will have a source of hydraulic pressure readily available. However, it is obvious that an electric motor or some other rotary power device might be used in place of the hydraulic device shown.

The actual agitating of the dirt and uprooting of undesired plants is done by an agitator 26 cosposed of a plate 27 having an array of teeth 28. The plate 27 is attached to the shaft 29 of the motor 18 so that the teeth 28 rotate about the axis of that shaft. The teeth are sharpened at their lower ends and 50 are adapted to dig into the ground or to pull out any plant with which they might become entangled.

The position of the agitator is controlled by the operator using a handle device 30 fixed to the mounting plate 23. This device may include an arch portion 31 near its mounting end, a main bar 32, and cross bars 33 which may include grip members 34. I prefer to use a hand control through the use of the hand grips because most people have relatively more accurate control of their hand movements than of foot movement. However, the arch portion 31 of the handle could be slightly modified to provide foot pads by which the operators feet could control the postion of the agitator.

In use, the device is mounted on the farm tractor by clamping the tool bar 10 to the lifting hitch on the tractor. Operators are seated in the seats 13 and can place their feet on the framework 12. It will be understood that foot pads may be provided for this purpose. The motors 18 are started and the tractor is driven over the fields slowly. As the device is carried over the plants, the operator presses the agitator onto any undesired plants—either weeds or, if thinning is desired, surplus plants. The action of the teeth will then uproot the undesired plant in much the same manner as a hoe. The operator is not limited to vertical movement of the agitator but can readily swing it from side to side, so that a relatively broad path may be covered in each pass over the field by the tractor.

Figure 3:
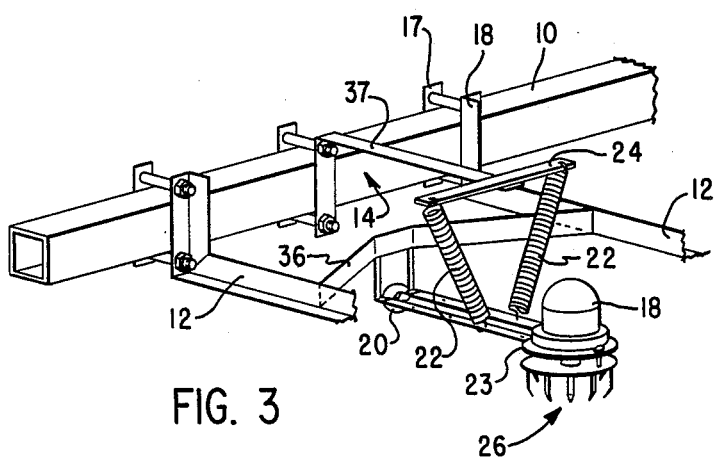
FIG. 3 is a partial pictorial view similar to FIG. 1 of an alternative device.

The alternative device illustrated in FIG. 3 is very similar to the above described device, but is presented to illustrate a device in which the operator's visibility of the ground over which he is traveling may be improved. In this device, the ball and socket joint 20 is mounted from a cross member 36 extending between the two legs of the frame 12. Also, I use a somewhat shortened horizontal leg 37 of the bracket 14 on which to mount the springs 22 supporting the motor 18. This structure removes some of the structure from the line of sight of the operator who is watching the ground over which he is riding, and therefore improves the opportunity of seeing all the weeds and extraneous plants rather than only a part of them.

I claim as my invention:

1. For mounting on a tractor having a tool bar, a device of the class described comprising a bracket removably mounted on said tool bar, said bracket having a vertically oriented member and a horizontal member extending in fixed position from the upper part of said vertically oriented member, a transverse member mounted on said horizontal member remote from said vertical member, bar means mounted on the lower end of the vertically oriented member beneath said horizontal member and spaced therefrom, said bar means being universally pivotally movable relative to said vertically oriented member, mechanically driven soil agitating means fixed to said bar means, and a pair of springs each having one end attached to said transverse member and the other end attached to said bar means near said soil agitating means, said first ends being spaced apart a wider distance than said other ends whereby said soil agitation means is resiliently and self-centeringly suspended.

2. The device of claim 1 in which handle means on said bar means allows an operator to manually control the position of said agitating means.

3. The device of claim 1 in which said agitator means includes a motor having a rotating shaft, plate means attached to said shaft and teeth extending from said plate means adapted to agitate any surface of earth which said teeth may contact.

4. The device of claim 1 in which a frame is attached to said tool bar in proximity to said bracket, seat means on said frame adapted for seating of an operator.

* * * * *